(12) United States Patent
Wilson et al.

(10) Patent No.: US 10,436,051 B2
(45) Date of Patent: Oct. 8, 2019

(54) SEAL SUPPORT STRUCTURE

(71) Applicant: United Technologies Corporation, Farmington, CT (US)

(72) Inventors: Ross Wilson, South Glastonbury, CT (US); Michael G. McCaffrey, Windsor, CT (US); John R. Farris, Bolton, CT (US); Theodore W. Hall, Berlin, CT (US); John J. Korzendorfer, Glastonbury, CT (US); Elizabeth F. Vinson, Wethersfield, CT (US); Jeffrey Michael Jacques, East Hartford, CT (US); John E. Paul, Portland, CT (US); Alan W. Stoner, Tullahoma, TN (US); Edwin Otero, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/921,503

(22) Filed: Oct. 23, 2015

(65) Prior Publication Data
US 2016/0115804 A1    Apr. 28, 2016

Related U.S. Application Data

(60) Provisional application No. 62/067,911, filed on Oct. 23, 2014.

(51) Int. Cl.
*F01D 11/00* (2006.01)
*F16J 15/16* (2006.01)
(Continued)

(52) U.S. Cl.
CPC ............ *F01D 11/00* (2013.01); *F01D 9/04* (2013.01); *F01D 9/042* (2013.01); *F01D 11/02* (2013.01);
(Continued)

(58) Field of Classification Search
CPC . F01D 11/00; F01D 9/04; F01D 9/042; F01D 11/02; F01D 11/025; F01D 11/12;
(Continued)

(56) References Cited

U.S. PATENT DOCUMENTS 3,124,502 A * 3/1964 Radke ................. F16J 15/20
                                                  277/536
3,319,929 A * 5/1967 Frederick .............. F01D 5/10
                                                  188/381
(Continued)

FOREIGN PATENT DOCUMENTS

EP      1148209 A2    10/2001
EP      2551492 A1     1/2013

OTHER PUBLICATIONS

Beam The Free Dictionary p. 1a.*
European Search Report; Application No. 15191124.5-1610/3034801; dated May 25, 2016; 9 pages.

*Primary Examiner* — Nathan Cumar
(74) *Attorney, Agent, or Firm* — Cantor Colburn LLP

(57) ABSTRACT

The present disclosure relates to sealing systems for gas turbine engines. In one embodiment, a seal support structure for a gas turbine engine includes a seal support configured to retain a circumferential seal and an engine support configured for mounting the seal support structure to a gas turbine engine mount. The engine support includes at least one channel configured to provide radial movement of the seal support structure and circumferential retention of the seal support. Another embodiment is directed to a sealing system including a circumferential seal and seal support structure configured to provide radial movement.

12 Claims, 3 Drawing Sheets

(51) Int. Cl.
　　　*F01D 9/04*　　　(2006.01)
　　　*F01D 11/02*　　(2006.01)
　　　*F01D 11/12*　　(2006.01)
(52) U.S. Cl.
　　　CPC ............ *F01D 11/025* (2013.01); *F01D 11/12* (2013.01); *F16J 15/16* (2013.01); *F05D 2220/32* (2013.01); *F05D 2240/55* (2013.01); *F05D 2260/96* (2013.01)
(58) Field of Classification Search
　　　CPC .. F05D 15/16; F05D 2220/32; F05D 2240/55; F05D 2260/96; F16J 15/16
　　　USPC .......................................................... 277/503
　　　See application file for complete search history.

(56) References Cited

U.S. PATENT DOCUMENTS

| | | | | |
|---|---|---|---|---|
| 3,408,048 A * | 10/1968 | Scalzo | .................. | F01D 11/025 415/113 |
| 3,807,891 A * | 4/1974 | McDow | .................. | F01D 11/08 415/116 |
| 3,829,233 A * | 8/1974 | Scalzo | .................. | F01D 11/005 277/419 |
| 4,411,594 A * | 10/1983 | Pellow | .................... | F01D 11/08 277/355 |
| 4,553,901 A * | 11/1985 | Laurello | ................. | F01D 11/24 415/116 |
| 6,196,790 B1 * | 3/2001 | Sheridan | ............... | F01D 11/003 415/111 |
| 2004/0247430 A1 * | 12/2004 | Brisson | ................. | F01D 11/001 415/174.2 |
| 2007/0098546 A1 * | 5/2007 | Cairo | .................... | F01D 11/005 415/170.1 |
| 2008/0124548 A1 * | 5/2008 | Sporer | ................... | C04B 35/48 428/402 |
| 2008/0265513 A1 * | 10/2008 | Justak | ................... | F01D 11/025 277/301 |
| 2011/0121519 A1 * | 5/2011 | Justak | ................... | F01D 11/025 277/412 |
| 2012/0308367 A1 * | 12/2012 | Luczak | ................... | F01D 11/12 415/173.1 |
| 2013/0309078 A1 | 11/2013 | Vo et al. | | |

* cited by examiner

SEAL SUPPORT STRUCTURE

CROSS REFERENCE TO RELATED APPLICATIONS

This application claims the benefit of U.S. Provisional Patent Application Ser. No. 62/067,911 filed Oct. 23, 2014, the entire contents of which are incorporated herein by reference thereto.

FIELD

The present disclosure relates to gas turbine engine sealing systems and, more particularly, to a seal support structure.

BACKGROUND

Gas turbine engine components are required to operate efficiently during engine operation and flight. Components within the gas turbine engine aid in protecting operation and allow for operation at a high speed. Engine components rotating at high speeds require even sealing in order to operate efficiently and also to reduce damage to the engine. However, rotation of engine components can create vibrations which may reduce the engine efficiency and cause engine wear. Accordingly, there is a need to provide components which minimize and/or limit vibration for a gas turbine engine.

BRIEF SUMMARY OF THE DISCLOSURE

Disclosed and claimed herein are sealing systems and sealing structures for circumferential seals. One embodiment is directed to a seal support structure for a gas turbine engine, the seal support including a seal support configured to retain a circumferential seal and an engine support. The engine support is configured for mounting the seal support structure to a gas turbine engine mount, wherein the engine support includes at least one channel configured to provide radial movement of the seal support structure and circumferential retention of the seal support.

In one embodiment, the seal support includes a runner and a shoulder configured to retain the circumferential seal.

In one embodiment, each channel is configured to receive a retaining element of the engine mount.

In one embodiment, each channel is an elongated slot oriented in a radial direction to provide radial motion for the seal support and engine support.

In one embodiment, radial movement of the seal support structure includes radial movement of the seal support structure relative to a static gas turbine engine mount, wherein radial movement includes movement to and away from a rotating component.

In one embodiment, circumferential retention of the seal support includes retaining, by the seal support structure, a circumferential seal relative to a rotating component of the gas turbine engine.

In one embodiment, the engine support is a full ring including a plurality of channels.

In one embodiment, at least one of the engine support and circumferential seal are segmented.

In one embodiment, each channel is configured to reduce vibration transmitted from the gas turbine engine to the circumferential seal.

In one embodiment, the seal support is configured to retain a circumferential seal having at least one beam and at least one shoe.

Another embodiment is directed to a sealing system for a gas turbine engine, the sealing system a circumferential seal and a seal support structure. The seal support structure includes a seal support configured to retain a circumferential seal, and an engine support configured for mounting the seal support structure to a gas turbine engine mount. The engine support includes at least one channel configured to provide radial movement of the seal support structure and circumferential retention of the seal support.

In one embodiment, the seal support includes a runner and a shoulder configured to retain the circumferential seal.

In one embodiment, each channel is configured to receive a retaining element of the engine mount.

In one embodiment, each channel is an elongated slot oriented in a radial direction to provide radial motion for the seal support and engine support.

In one embodiment, radial movement of the seal support structure includes radial movement of the seal support structure relative to a static gas turbine engine mount, wherein radial movement includes movement to and away from a rotating component.

In one embodiment, circumferential retention of the seal support includes retaining, by the seal support structure, a circumferential seal relative to a rotating component of the gas turbine engine.

In one embodiment, the engine support is a full ring including a plurality of channels.

In one embodiment, at least one of the engine support and circumferential seal are segmented.

In one embodiment, each channel is configured to reduce vibration transmitted from the gas turbine engine to the circumferential seal.

In one embodiment, the seal support is configured to retain a circumferential seal having at least one beam and at least one shoe.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE DISCLOSURE

Overview and Terminology

One aspect of the disclosure relates to a sealing system for a gas turbine engine. One embodiment is directed to a sealing structure including one or more channels in an engine support of the sealing structure to provide radial movement of the sealing support while still allowing for a circumferential seal to operate within a gas turbine engine.

Another embodiment is directed to a system configured to seal air in a gas turbine engine. The sealing support structure may be used in one or more compartments or systems of a gas turbine engine, such as bearing compartments, gear systems, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
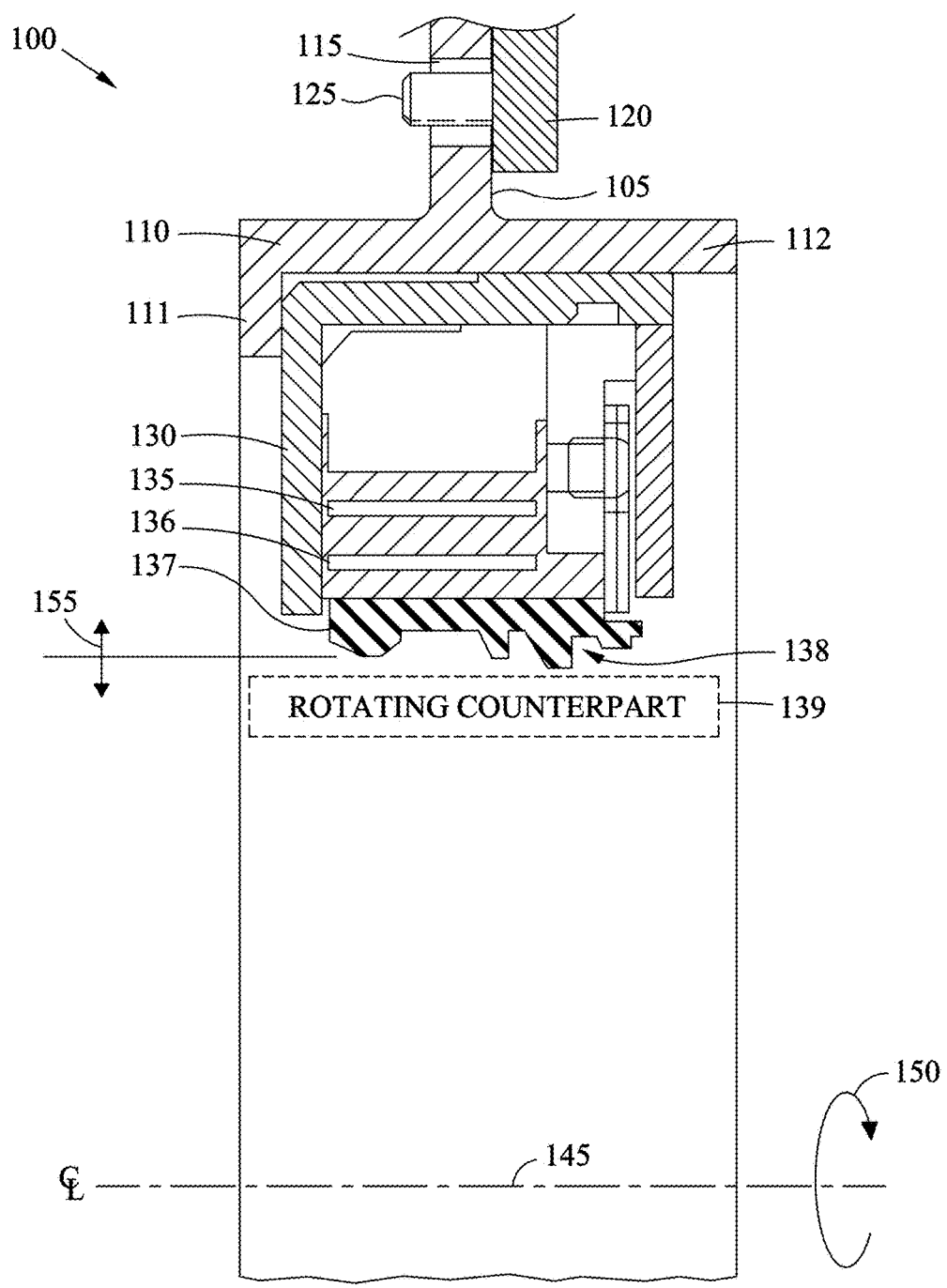
FIG. 1 depicts a cross-sectional representation of a seal support structure for a gas turbine engine according to one or more embodiments.

FIG. 1 depicts a cross-sectional representation of a seal support structure for a gas turbine engine according to one or more embodiments. According to one embodiment, seal support structure 100 includes engine support 105 and seal support 110. Engine support 105 is configured for mounting the seal support structure 100 to a gas turbine engine mount 120. Engine support 105 may be a flange portion of seal support structure 100. Engine support 105 may include one or more channels, or elongated openings shown as channel 115. Each of the channels in engine support 105, such as channel 115, may be configured to provide radial movement of the seal support structure 100 and circumferential retention of the seal support 100 and circumferential seal 130. In one embodiment, channel 115 is an elongated slot oriented in a radial direction to provide radial motion for the seal support 110 and engine support 105. In one embodiment, engine support 105 is a full ring including a plurality of channels. In another embodiment, at least one of engine support 105 and circumferential seal 130 are segmented.

Seal support 110 is configured to retain circumferential seal 130. Seal support 110 includes shoulder 111 and runner 112 configured to retain circumferential seal 130. Runner 111 may be a lip in parallel or substantially parallel engine support 105 and extending over a face of circumferential seal 130. Runner 112 extends along the outer diameter of circumferential seal 130.

Seal support structure 100 may interface with gas turbine engine mount 120, which is a static engine support, and in particular retention element 125 of gas turbine engine mount 120. In one exemplary embodiment, channels, such as channel 115 of engine support 105 may allow for movement of the seal support structure 110 radially relative to retention element 125. Each channel 115 is configured to receive a particular retaining element of the engine mount, such as retention element 125.

Seal support 110 is configured to retain a circumferential seal having at least one beam and at least one shoe. According to one embodiment, circumferential seal 130 includes at least one outer beam 135 and at least one inner beam 136. Circumferential seal 130 includes at least one seal shoe 138.

Radial movement of the seal support structure 100 includes radial movement of the seal support structure 100 relative to a static mount, such as gas turbine engine mount 120, wherein radial movement includes movement to and away from a rotating component 139. Circumferential retention of the seal support 110 includes retaining, by the seal support structure 100, a circumferential seal 130 relative to a rotating component 139 of the gas turbine engine. FIG. 1 illustrates axis of rotation 145 of rotating component 139, rotation 150 of rotating component 139, and radial motion 155.

According to one embodiment, each channel 115 of seal support structure 100 is configured to reduce vibration transmitted from the gas turbine engine to the circumferential seal 130. By way of example, seal support structure 100 providing channels, shown as 115, can allow for movement of the seal support structure and/or circumferential seal 130 to move radially as shown by 155.

Figure 2:
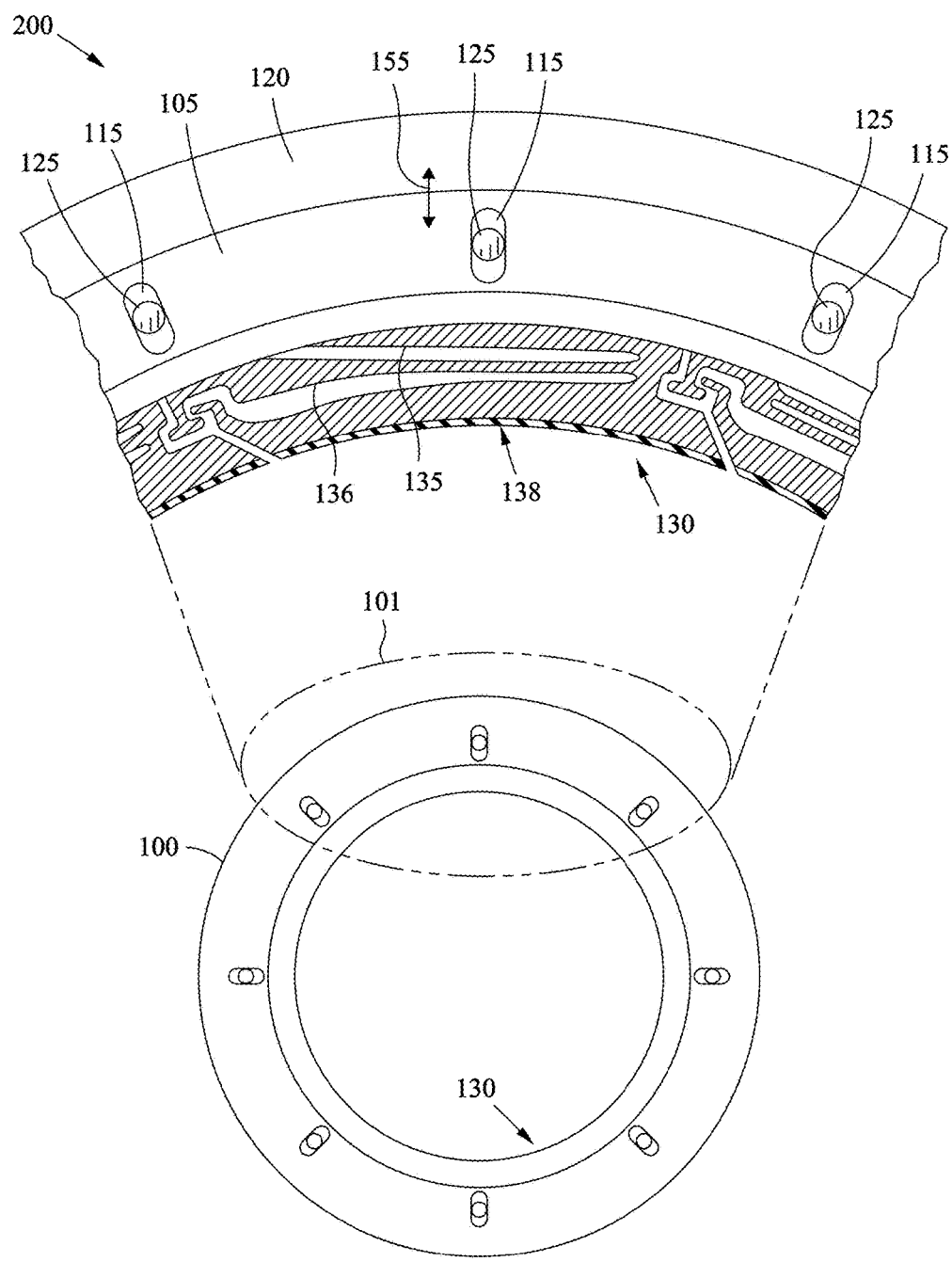
FIG. 2 depicts a graphical representation of a sealing system according to one or more embodiments.

FIG. 2 depicts a graphical representation of a sealing system 200 according to one or more embodiments. According to one embodiment, a sealing system 200 includes seal support structure 100 and circumferential seal 130. FIG. 2 illustrates seal support structure 100 as a full ring. According to one embodiment, elements of seal support structures (e.g., engine support, seal support, etc.) may be segmented. In other embodiments, elements of seal support structures (e.g., engine support, seal support, etc.) may be non-segmented rings (e.g., hoops, etc.).

FIG. 2 is a representation of a sealing system 200 viewing the sealing system along its front face including an enlarged representation of a portion of the sealing system shown as 101.

Sealing system 200 may be configured to allow for a seal support structure, to move radially relative to a static engine support, shown as gas turbine engine mount 120. Engine support 105 is configured for mounting the seal support structure 100 to a gas turbine engine mount 120, wherein the engine support 105 may move radially, as shown by direction 155. Channels shown as 115 are configured to provide radial movement of the seal support structure 100 and circumferential retention of the circumferential seal 130. Retention element 125 is coupled or affixed to gas turbine engine mount 120 such that the sealing support structure moves relative to the retaining elements 125.

Circumferential seal 130 is shown in FIG. 2 according to one or more embodiments. Circumferential seal 130 includes outer beam 135, inner beam 136 and seal shoe 138.

Figure 3A:
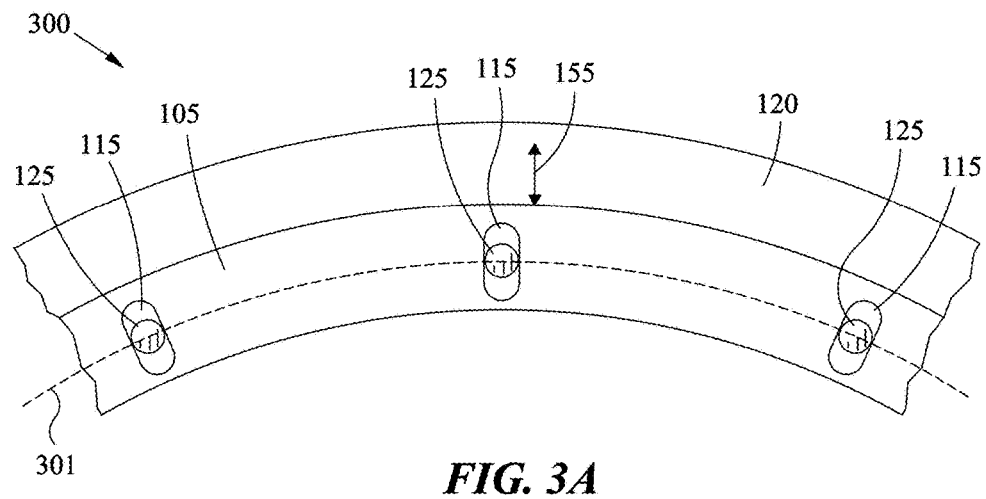
FIGS. 3A-3B depict graphical representations of a seal support structure according to one or more embodiments.
Figure 3B:
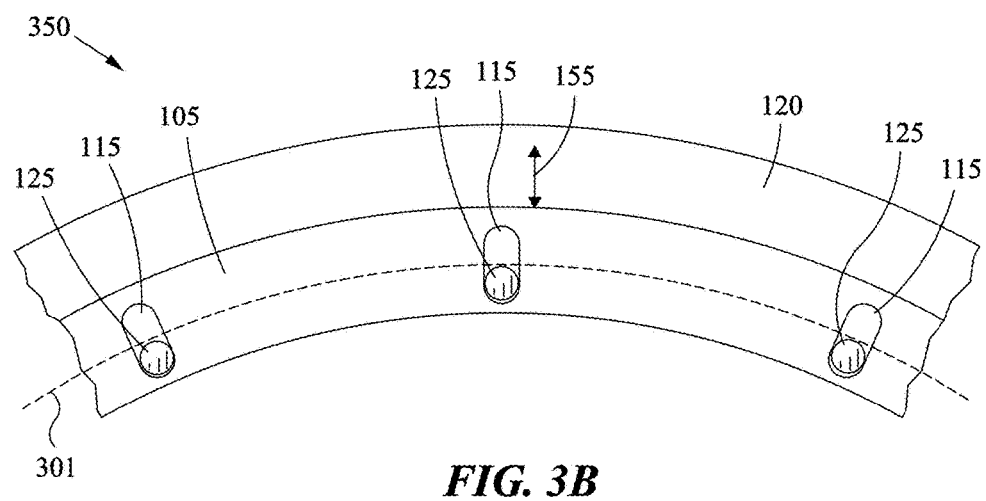

FIGS. 3A-3B depict graphical representations of a seal support structure according to one or more embodiments. FIGS. 3A-3B depict exemplary representations of movement of the seal support structure 100. FIG. 3A depicts first position, shown as 300, of seal support structure 100. First position 300 is an exemplary position. As shown, engine support 105, including channels shown by 115, is mounted to gas turbine engine mount 120 and retaining elements shown as 125. For the purpose of illustration, channels 115 and retaining elements shown as 125 are depicted relative to reference line 301. Engine support 105, and or elements of the sealing support structure 100 may move radially, as shown by direction 155.

FIG. 3B, depicts a second position, shown as 350, of seal support structure 100. Second position 350 is an exemplary position. As shown, engine support 105, including channels shown by 115, is mounted to gas turbine engine mount 120 and retaining elements shown as 125. For the purpose of illustration, channels 115 and retaining elements shown as 125 are depicted relative to reference line 301. FIG. 3B illustrates the movement of engine support 105, as shown by the change in position of retaining elements 125 relative to reference line 301 and channels 115. According to one embodiment, movement of engine support 105, and/or one or more elements of seal support structure can dampen vibrations from a gas turbine engine to a circumferential seal.

While this disclosure has been particularly shown and described with references to exemplary embodiments thereof, it will be understood by those skilled in the art that various changes in form and details may be made therein without departing from the scope of the claimed embodiments.

What is claimed is:

1. A seal system between a static engine mount of a gas turbine engine and a rotating component operationally connected to the gas turbine engine, wherein an axial direction is parallel to an axis of rotation for the rotating component and a radial direction extends outwardly from the axis of rotation, the seal system comprising:
    a circumferential seal operationally connected with a radial outer portion of the rotating component, the circumferential seal having L-shaped cross section with an axial segment and a radial segment,
    a seal support operationally connected to the static engine mount, the seal support having L-shaped cross section with an axial segment defining a runner and a radial segment defining a shoulder;
    the circumferential seal and the seal support are configured so that: (i) the runner is disposed against a radially outer side of the axial segment of the circumferential seal; and (ii) the shoulder is disposed against the radial segment of the circumferential seal; and
    the runner including an engine support that extends radially outwardly;
    wherein:
    one of the engine support and engine mount includes a plurality of circumferentially offset channels, each of the channels extending in the radial direction, and another of the engine support and engine mount includes a plurality of a retaining elements that extend axially into a respective one of the channels.

2. The seal support structure of claim 1, wherein radial movement of the seal support structure includes radial movement of the seal support structure relative to the static engine mount, wherein radial movement includes movement to and away from the rotating component.

3. The seal support structure of claim 1, wherein circumferential retention of the seal support includes retaining, by the seal support structure, the circumferential seal relative to the rotating component of the gas turbine engine.

4. The seal support structure of claim 1, wherein the seal support circumferentially extends to form a full ring and includes the plurality of the channels.

5. The seal support structure of claim 1, wherein at least one of the seal support and circumferential seal are segmented.

6. The seal support structure of claim 1, wherein the circumferential seal includes at least one beam and at least one shoe.

7. A gas turbine engine comprising:
    a static engine mount and a rotating component operationally connected to the gas turbine engine, wherein an axial direction is parallel to an axis of rotation for the rotating component and a radial direction extends outwardly from the axis of rotation; and
    a seal system between the static engine mount of the gas turbine engine and the rotating component, the seal system comprising:
    a circumferential seal operationally connected with a radial outer portion of the rotating component, the circumferential seal having L-shaped cross section with an axial segment and a radial segment,
    a seal support operationally connected to the static engine mount, the seal support having L-shaped cross section with an axial segment defining a runner and a radial segment defining a shoulder;
    the circumferential seal and the sea support are configured so that: (i) the runner is disposed against a radially outer side of the axial segment of the circumferential seal; and (ii) the shoulder is disposed against the radial segment of the circumferential seal; and
    the runner including an engine support that extends radially outwardly;
    wherein:
    one of the engine support and engine mount includes a plurality of circumferentially offset channels, each of the channels extending in the radial direction, and another of the engine support and engine mount includes a plurality of a retaining elements that extend axially into a respective one of the channels.

8. The engine of claim 7 wherein radial movement of the seal support structure includes radial movement of the seal support structure relative to the static engine mount, wherein radial movement includes movement to and away from the rotating component.

9. The engine of claim 7, wherein circumferential retention of the seal support includes retaining, by the seal support structure, the circumferential seal relative to the rotating component of the gas turbine engine.

10. The engine of claim 7, wherein the seal support circumferentially extends to form a full ring and includes plurality of the channels.

11. The engine of claim 7 wherein at least one of the seal support and circumferential seal are segmented.

12. The engine of claim 7 wherein the circumferential seal includes at least one beam and at least one shoe.

* * * * *